United States Patent [19]

Peters

[11] 4,050,777
[45] Sept. 27, 1977

[54] SOLAR ENERGY REFLECTING APPARATUS WITH YIELDABLY BIASED REFLECTORS

[75] Inventor: Melville F. Peters, Livingston, N.J.

[73] Assignees: Walter Todd Peters; Margot Elizabeth Peters; Albert F. Kronman, all of East Dennis, Mass.

[21] Appl. No.: 751,844

[22] Filed: Dec. 17, 1976

[51] Int. Cl.² .............................. G02B 5/08; F24J 3/02
[52] U.S. Cl. ..................................... 350/292; 126/270
[58] Field of Search ................. 350/292, 299, 289, 16, 350/264; 126/270, 271; 353/3

[56] References Cited
U.S. PATENT DOCUMENTS

| | | | |
|---|---|---|---|
| 1,229,420 | 6/1917 | Dixon | 350/292 |
| 1,632,254 | 6/1927 | Vindgradou | 350/299 |
| 1,951,404 | 3/1934 | Goddard | 350/292 |
| 3,906,927 | 9/1977 | Caplan | 350/299 |
| 4,011,854 | 3/1977 | Brantley | 126/270 |

*Primary Examiner*—Jon W. Henry
*Attorney, Agent, or Firm*—Albert F. Kronman

[57] ABSTRACT

A plurality of mirrors carried upon a support is disposed to reflect and focus solar energy upon an absorber or into an enclosure. The mirrors are mounted upon the support to deflect under high wind conditions and thereafter return to their optimum reflecting or focusing position. Simplified control mechanisms are disclosed for following the sun to insure the continuity of operation of the apparatus throughout each day.

11 Claims, 12 Drawing Figures

SOLAR ENERGY REFLECTING APPARATUS WITH YIELDABLY BIASED REFLECTORS

BACKGROUND OF THE INVENTION

The use of mirrors to collect the sun's rays and direct them into absorbers, boilers and photovoltaic cells is now wellknown and illustrated in such prior art patents as U.S. Pat. Nos. 3,466,119; 3,872,854; and 3,905,352. Such prior art devices, however, are of expensive design and subject to malfunction due to ambient conditions such as storms and high winds. In addition, where complicated mechanical linkages are employed to mount and focus the mirrors, further loss of operability is encountered.

Accordingly, it is an object of the present invention to provide an inexpensive solar reflecting panel assembly which can be installed to service both new and old buildings.

Another object of the present invention is to provide a solar reflecting panel of light, inexpensive construction which can, nevertheless, withstand high wind velocities.

A further object of the present invention is to provide a solar reflecting panel assembly which will require a minimum amount of servicing to keep it operating.

Still another object of the present invention is to provide a simplified solar panel orienting mechanism.

A feature of the present invention is its rotatably mounted solar light reflecting strips which present a minimum surface in the presence of winds above a predetermined velocity.

Another feature of the present invention is its reflecting strip mounting whereby the said strips resume their proper orientation when winds subside.

A feature of the present invention is its simplified mechanical apparatus for orienting the solar energy reflecting panel.

SUMMARY OF THE INVENTION

In a preferred embodiment of the present invention a plurality of elongated light reflecting strips are carried upon a support to form a solar reflecting panel. Each strip is pivotally carried at its ends by the support so that its elongated margins are disposed next to adjacents trip margins to form part of the solar reflecting array. In the presence of high winds or gusts the individual strips turn upon their end supports to present a minimum wind resistance. The strips return to their operative position when the wind decreases. A simplified mechanical cam and gear arrangement moves the panel to its optimum operating position during each day.

BRIEF DESCRIPTION OF THE DRAWINGS

In the accompanying drawings forming part hereof similar parts have been given the same reference numbers, in which drawings.

DESCRIPTION OF THE PREFERRED EMBODIMENTS

Figure 1:
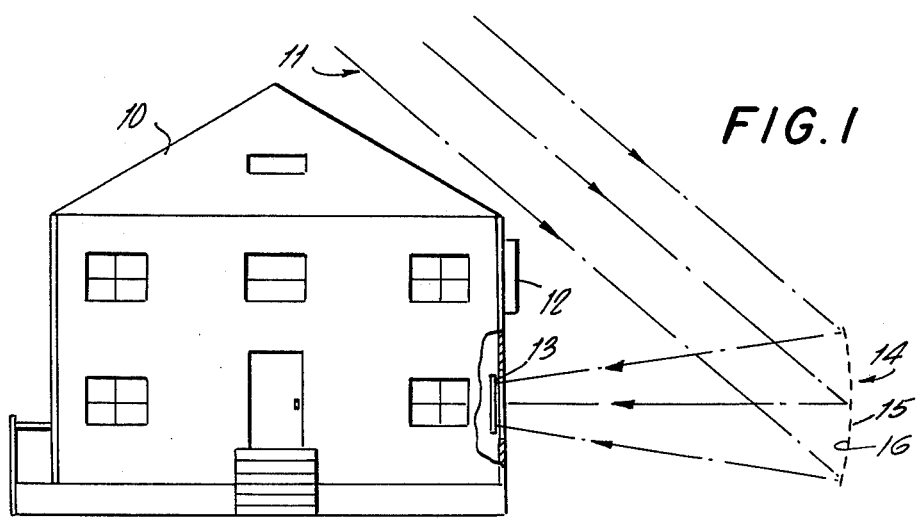
FIG. 1 is a somewhat diagrammatic view of a building showing a solar reflecting panel directing solar energy through a window upon an absorber.

Referring to the drawings and particularly to FIG. 1; 10 indicates a building or other structure upon which there is directed solar energy indicated by the arrows 11 by means of a reflector assembly 14. The energy may be directed into a solar absorber 12 secured to the outer wall of the structure 10 or alternately, onto an absorber 13 located within the building. The nature of the solar absorber may vary widely, is well-known in the art, and forms no part of the present invention.

The reflector or assembly 14 generally consists of a plurality of elongated mirror like strips 15 which are carried in side by side relationship with either a vertical or horizontal orientation. The reflector strips 15 are preferably made of highly polished metal such as aluminum or steel. Alternately, the strips may be made of plastic having a highly reflective coating on one face thereof. The reflector strips 15 are formed of material which is thick enough to give it the desired rigidity but said thickness is held to a minimum. The reflective faces 16 are relatively wide and limited only by the consideration of providing small inertia to the reflectors in the presence of wind conditions.

Figure 2:
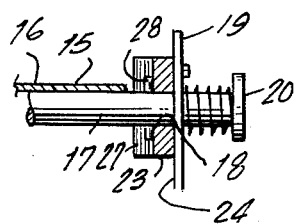
FIG. 2 is a fragmentary view taken on line 2–2 in FIG. 6, on a reduced scale.
Figure 6:
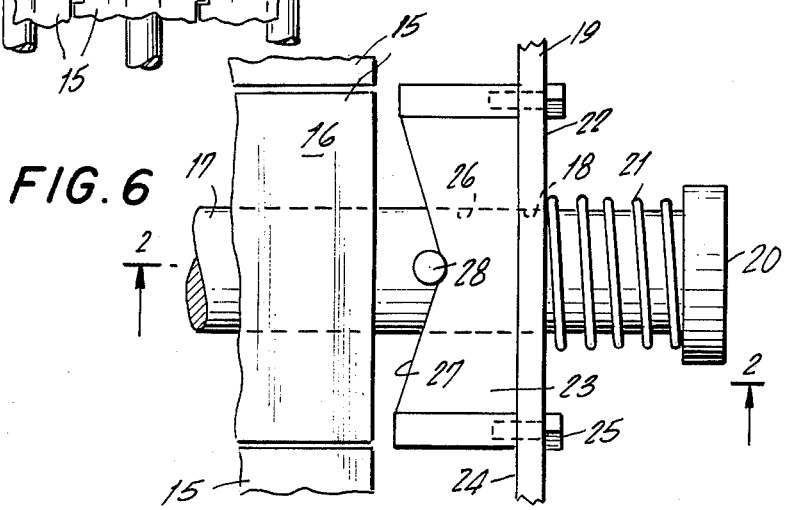
FIG. 6 is a fragmentary view in front elevation of the embodiment shown in FIG. 2.

Referring to FIGS. 2 and 6, which illustrate a reflective array in which the strips 15 are disposed in horizontal arrangement, it will be seen that the said strips 15 are secured to a shaft 17 which may extend for the length of the reflectors or merely be secured at each end thereof. The shaft 17 is led through an opening 18 in an upstanding rigid frame 19. The shaft 17 on one end of the reflector strip 15 extends beyond the frame 19 and terminates in a button 20 which forms a stop for a coil spring 21. The opposite end of the coil spring 21 bears against the outer surface 22 of the frame 19. The coil spring 21 is compressed so as to yieldably urge the button 20 away from the outer surface 22 of the frame 19.

A rigid block 23 is secured to the inner surface 24 of the frame 19 opposite the spring by means of bolts 25 or the like. The block 23 is centrally bored as indicated at 26 to receive the shaft 27 therethrough.

A V-shaped recess 27 is formed in the block 23 to receive a pin 28 transversely carried by the shaft 19 and extending therefrom on either side into the V-shaped recess 27. The recess 27 has an arcuate seat 29 (see FIG. 5) in which the pin 28 normally rests. It will be understood, the shaft on the opposite end of the reflector strip or the opposite end of the shaft 17 (not shown) merely rides in opening 18 or bearing in the frame. The spring 21 between the outer surface 22 of the frame 19 and the button 20 holds the shaft 28 within the arcuate seat 29 when the reflector strip 15 is in its normal operating orientation.

In the presence of strong winds the reflector strips 15 are caused to rotate the axis of shaft 17 thereby causing the pins 28 to move out of the bottom of the V-shaped recesses 27 and climb the ramp of the said recesses. When the winds cease, the strips resume their normal position whereupon the pins 28 move back into their respective arcuate seats 29. The pins 28 may be journaled within the shafts 17 to facilitate this movement.

Figure 8:
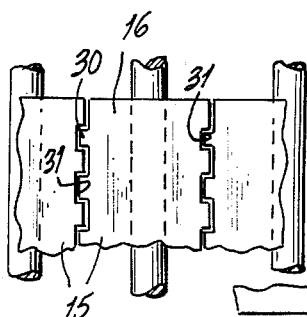
FIG. 8 is a view in front elevation on a reduced scale of a portion of the reflecting panel showing the control means for the reflectors.

The reflector strips 15 are caused to rotate in the same direction by means of unequal areas on each side of the shaft 17. This inequality is achieved by means of the structures shown in FIGS. 4, 7 and 8, however, other devices suitable for this purpose will readily occur to those skilled in the art. The reflector strips 15 shown in FIG. 8 are provided on one of their elongated margins with a series of outwardly extending tabs 30 and on the opposite margin with a series of tab receiving cutouts 31. In this matter, the area subject to wind resistance on each side of the longitudinal axis of the reflector strips is unequal. It will be apparent that adjacent reflector strip edges receive the tabs or are received into complimentary cutouts for their tabs.

Figure 7:
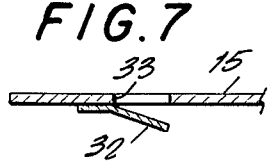
FIG. 7 is a fragmentary view showing a reflector control structure for the present invention.

In the embodiment shown in FIG. 7, small flaps 32 are hingedly secured to the reflector strip 15 in registration with apertures 33 in the said strips. By placing the flaps 32 inwardly spaced from one of the margins of the reflector strips the said strip can be caused to rotate in one direction should the wind change its direction. The direction of rotation depending upon whether the flaps 32 are closed or are opened by the wind, thereby permitting or resisting the flow of air through the openings 33.

Figure 3:
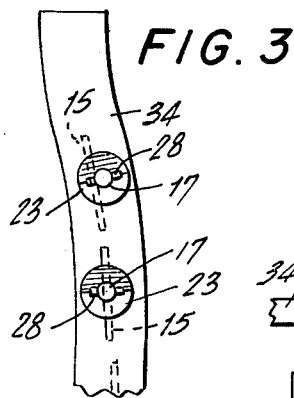
FIG. 3 is a fragmentary top plan view of another embodiment of the present invention.
Figure 4:
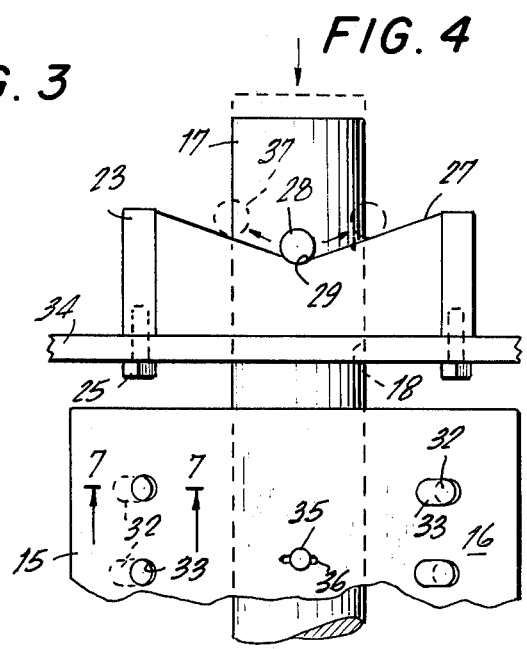
FIG. 4 is a fragmentary view in front elevation on an enlarged scale of the embodiment shown in FIG. 3.

It is within the purview of the present invention to mount the reflector strips vertically on a frame 34 as shown in FIGS. 3 and 4. Here again, the reflector strips 15 are secured to shafts 17 by any suitable means such as the small rods 35 as shown in FIG. 4. The rods 35 extend through the reflectors 15 and two or more shear pins 36 are employed to secure the strip to the rod. The shear pin 36 or some other suitable device is employed to protect the assembly from some sudden gust of wind of sufficient violence that the only way to protect the reflectors is to have them separate from the rods 17. The strength of the shear pins 36 can be designed from wind tunnel studies and need not be further elaborated upon.

Figure 5:
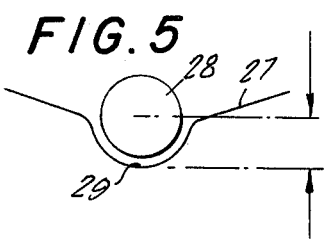
FIG. 5 is a fragmentry view of the support bearing shown in FIG. 4.

The assembly shown in FIG. 4 constitutes the upper support for the shaft 17 and it will be understood that the lower portion of the reflector 15 is secured to a shaft 17 which merely rotates and moves upward freely within an opening in the bottom of the frame (not shown). It will be apparent from the examination of FIG. 4 that the top of the frame 34 is again provided with a rigid block 23 secured thereto by bolts 25. The V-shaped recess 27 in the block 23 receives the pin 28 and the arcuate seat 29, best shown in FIG. 5 is provided therein. When the reflector 15 is rotated due to strong winds, the pin 28 moves into one of the positions shown in dashed lines in FIG. 4 at 37. At this juncture, the reflector strip 15 will be disposed with one of its edges in the direction of the wind to present a minimum surface to the wind, thereby avoiding wind damage. When the winds subside, the pins 28 will roll or slide down into the arcuate seat 29 restoring the reflector strip 15 to its proper reflecting orientation.

Figure 9:
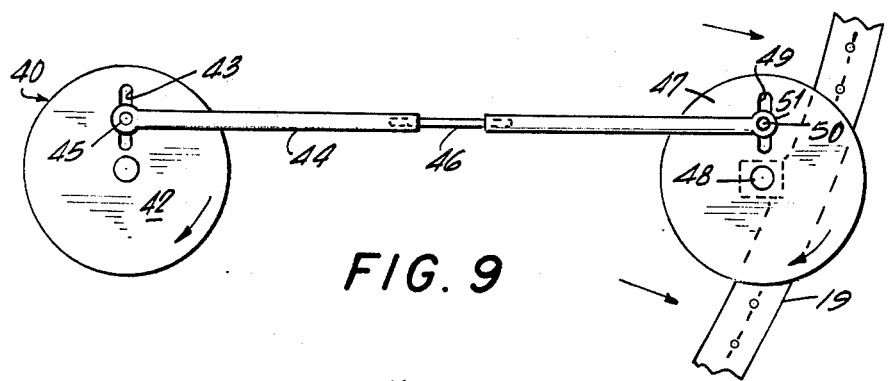
FIG. 9 is a somewhat diagrammatic view in a side elevation of a reflector drive mechanism for sun-tracking according to the present invention.

Referring to FIG. 9, there is shown a tilt drive assembly 40 attached to the frame 19 of the solar reflecting apparatus 14. The tilt drive assembly 40 is driven by a source of rotary power such as a motor and gear reduction unit (not shown) which is wellknown and need not be further described. The output shaft 41 of the gear reduction unit is secured to a flat disc or drive wheel 42. The drive wheel 42 is provided with an elongated radial slot 43 for adjustment purposes. A drive rod 44 is freely secured at one end to a pin 45 extending from the slot 43 and adjustably secured therein. The drive rod 44 is also provided with a turnbuckle link 46 intermediate its ends to permit of length adjustment.

A driven wheel 47 is affixed to a small shaft 48 secured to the frame 19 in line with the horizontal axis of the said frame. The driven wheel is also provided with an elongated radial slot 49. A second pin 50 is adjustably secured to the elongated slot 49 and the end 51 of the drive rod 44 is freely secured to the said pin.

The source of rotary power and reduction gear are selected to rotate the drive wheel 42, in the direction indicated by the arrow, one complete revolution for each twenty-four hours. As a result, the frame 19 will be tilted upwardly to follow the sun each day and will move in the opposte direction after sun-set until it reaches its starting point for the next day. This operation is continuous and can be changed for different seasons by adjustment of the pins 45, 51 and the turnbuckle link 46.

In order to correct for the position of the sun with respect to the earth as the seasons change, it is necessary to swing the solar reflexing apparatus so as to follow the sun. A simplified arrangement such as those shown in FIGS. 10 - 12 may be used for this purpose.

Figure 10:
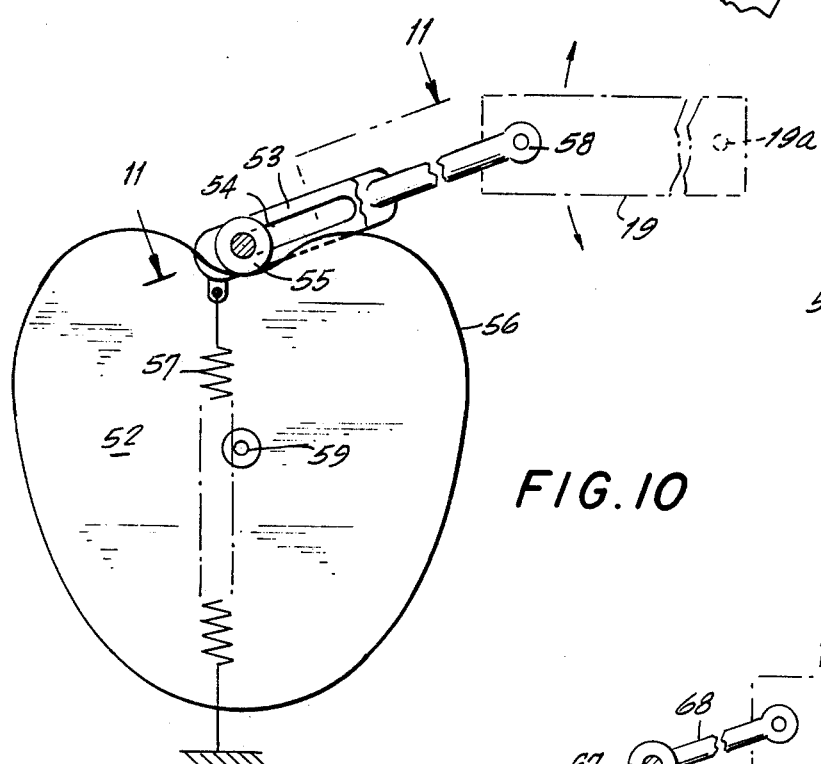
FIG. 10 is a plan view of a cam and follower assembly for sun-tracking according to the present invention.
Figure 11:
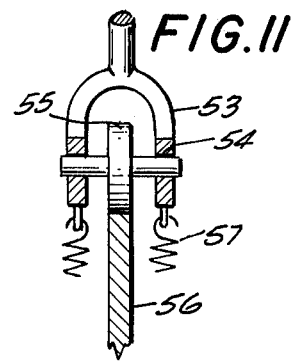
FIG. 11 is a view taken on line 11—11 in FIG. 10.

The embodiment of FIGS. 10 and 11 employs a heart shaped cam 52 whose cam surface 56 configuration can be computed from well-known equations. An elongated drive rod 53 having an elongated axial slot 54 is operatively coupled to a cam follower 55. The cam follower 55 is kept in contact with the cam surface 56 at all times by means of a spring 57 or other suitable device. The opposite end of the drive rod 53 is secured to the frame 19 as indicated at 58.

The cam 52 is rotated by the output shaft 59 of a suitable source of rotary power (not shown). The speed of the power source will turn the cam through a complete revolution once each year thereby swinging the frame upon a pivot 19a to track the position of the sun.

Figure 12:
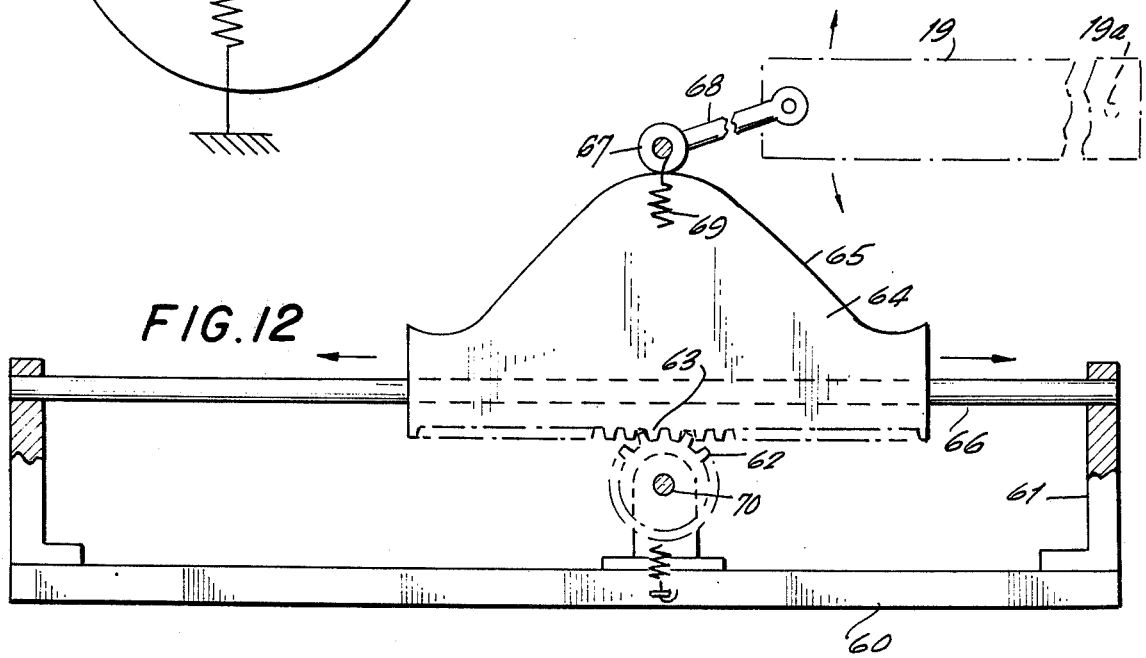
FIG. 12 is a plan view of another cam assembly for sun-tracking useful in the present invention.

In FIG. 12 there is shown an alternate sun tracking mechanism in which a drive rack is employed. The drive rack includes a base 60, upstanding supports 61 on the base and a horizontal rod 66 supported at each end on the base. A spur gear 62 is rotatably mounted on the base upon the output shaft 70 of a suitable power source.

The spur gear 62 is in mesh with a gear rack 63 forming part of a cam 64. The cam is slidably carried upon the rod 66 for lateral movement when driven by the spur gear 62.

The cam surface 65 supports a cam follower 67 carried on one end of a drive rod 68. The opposite end of the drive rod 68 is secured to the frame 19 of the solar reflecting assembly 14. A spring 69 serves to keep the cam follower 67 in contact with the cam surface 65 at all times.

As the cam 64 is moved along the rod 66 from one end of the drive rack to the other, the frame 19 will be swung by the drive rod 68 absust pivot 19a to track the sun. The shape of the cam face 65 is derived from wellknown formulae, and is intended to adjust the position of the frame 19 for a whole year.

From the foregoing it will be seen that there has been disclosed a relatively simple and inexpensive solar energy reflecting apparatus capable of continuous operation without supervision and able to withstand high wind conditions despite the large solar relfecting area of the apparatus.

Having thus fully described the invention which is desired to be claimed and secured by Letters Patent is:

1. Solar energy reflecting apparatus comprising a frame, a plurality of elongated strips carried by said frame, at least one light reflecting major face on each strip, elongated margins on each strip disposed in side by side orientation with next adjacent strip margins, said light reflecting major faces oriented to form a light reflecting panel, at least one shaft secured to each strip and extending axially and outwardly thereof, bores in the frame to freely receive the free ends of the shafts therethrough, means to yieldably restrain the shafts from turning within the frame bores, means to return the strips to their reflecting orientation in the event of rotation and means to tilt and swing the frame to effect both diurnal and seasonal tracking of the sun.

2. Apparatus according to claim 1 in which biasing means carried by the shafts are used to restrain the shafts from turning.

3. Apparatus according to claim 2 in which the biasing means are springs.

4. Apparatus according to claim 1 in which the frame holds the elongated strips in an arcuate array.

5. Apparatus according to claim 1 in which the strips are provided with means to cause them to rotate in the same direction in the presence of high winds.

6. Apparatus according to claim 5 in which the rotation direction means comprise a series of outwardly extending spaced tabs along one elongated margin and a series of tab receiving recesses along the opposite margin of each strip whereby the area of each strip face is unequally distributed on each side of its longitudinal axis.

7. Apparatus according to claim 5 in which the rotation direction means comprises a series of openings spaced from the elongated margins on each strip and flaps means overlying said openings to admit or obstruct wind incident thereon.

8. Apparatus according to claim 1 in which the strip returning means comprises a V-shaped block secured to the frame, for each strip a bore in said block in register with the shaft receiving bore in the frame to receive the shaft therethrough and a pin, transversely carried by the shaft and disposed within the "V" of said block.

9. Apparatus according to claim 8 in which the shaft ends in a button and a spring is disposed between the button and the frame to urge the pin to contact with the "V" at all times.

10. Apparatus according to claim 8 in which an arcuate seat is provided in the bottom of the V-shaped recess in the block to receive the pin when the strip is properly oriented.

11. Apparatus according to claim 1 in which the means to tilt and swing the frame comprises a first cam, a source of rotary power for the first cam and a link having a cam follower on one end in operative contact with said cam, and a second cam, a source of rotary power for said second cam, a cam follower operatively coupled to the second cam and a drive link secured to the cam follower at one end and to the frame at the opposite end, and a pivotal mount to permit frame movement in response to said cams.

* * * * *